United States Patent
Nakamura et al.

(10) Patent No.: US 8,720,299 B2
(45) Date of Patent: May 13, 2014

(54) TILTABLE STEERING WHEEL APPARATUS FOR WORK VEHICLE

(75) Inventors: Norimi Nakamura, Sakai (JP); Koji Fujiwara, Sakai (JP); Hiroaki Kitaguchi, Takaishi (JP); Koji Nada, Sakai (JP)

(73) Assignee: Kubota Corporation, Osaka (JP)

( * ) Notice: Subject to any disclaimer, the term of this patent is extended or adjusted under 35 U.S.C. 154(b) by 190 days.

(21) Appl. No.: 13/051,565

(22) Filed: Mar. 18, 2011

(65) Prior Publication Data

US 2011/0314953 A1 Dec. 29, 2011

(30) Foreign Application Priority Data

Jun. 29, 2010 (JP) ................. 2010-147311

(51) Int. Cl.
*B62D 1/16* (2006.01)
*B62D 1/18* (2006.01)

(52) U.S. Cl.
USPC ................. 74/493; 74/492; 280/775

(58) Field of Classification Search
USPC ................. 74/492–495; 280/775, 779, 780
See application file for complete search history.

(56) References Cited

U.S. PATENT DOCUMENTS

| | | | | |
|---|---|---|---|---|
| 4,495,833 A * | 1/1985 | Fourrey et al. | ................. | 74/493 |
| 5,088,766 A * | 2/1992 | Nakatsuka et al. | ............ | 280/775 |
| 7,077,027 B2 * | 7/2006 | Krizan et al. | ................... | 74/493 |
| 7,165,786 B1 * | 1/2007 | Sha et al. | ........................ | 280/775 |
| 7,364,197 B2 * | 4/2008 | Nishioka et al. | ............... | 280/775 |
| 7,412,911 B2 * | 8/2008 | Nishioka et al. | ................ | 74/493 |
| 7,475,908 B2 * | 1/2009 | Senn | ............................. | 280/775 |
| 2004/0083844 A1 * | 5/2004 | Krizan et al. | .................. | 74/492 |
| 2005/0081674 A1 * | 4/2005 | Nishioka et al. | ................ | 74/493 |
| 2009/0107284 A1 * | 4/2009 | Lucas et al. | ..................... | 74/495 |

FOREIGN PATENT DOCUMENTS

| | | |
|---|---|---|
| JP | 57121360 | 6/1982 |
| JP | 63170375 U | 11/1988 |
| JP | 398180 U | 10/1991 |
| JP | 11334605 A | 12/1999 |

* cited by examiner

*Primary Examiner* — Troy Chambers
*Assistant Examiner* — Jake Cook
(74) *Attorney, Agent, or Firm* — The Webb Law Firm

(57) ABSTRACT

A tiltable steering wheel apparatus comprises a tilting mechanism provided under a grip portion of a steering wheel. The tilting mechanism includes a steering wheel support member for supporting the steering wheel to be tiltable about a pivotal axis extending along a transverse direction of a vehicle body, and a control lever switchable between a tilting allowing mode for allowing tilting movement of the steering wheel and a tilting preventing mode for preventing tilting movement of the steering wheel. The control lever has an extension extending toward the grip portion with a manual control portion provided in a distal end thereof to be operable with the fingers of the operator holding the grip portion of the steering wheel.

12 Claims, 10 Drawing Sheets

TILTABLE STEERING WHEEL APPARATUS FOR WORK VEHICLE

TECHNICAL FILED

The present invention relates to a tiltable steering wheel apparatus for a work vehicle comprising a rotatable steering wheel, and a tilting mechanism including a steering wheel support member for supporting the steering wheel to be tiltable about a pivotal axis extending along a transverse direction of a vehicle body, both of which are provided forwardly of a driver's seat. The tilting mechanism further includes a control lever switchable between a tilting allowing, mode for allowing tilting movement of the steering wheel and a tilting preventing mode for preventing tilting movement of the steering wheel, and a lever support member for pivotably supporting the control lever about a swing axis extending along the transverse direction of the vehicle body. Further, the steering wheel includes an annular grip portion to be rotatable about a rotational axis of the steering wheel.

BACKGROUND ART

The steering wheel apparatus for the work vehicle as noted above comprises the tilting mechanism mounted forwardly of the driver's seat for tilting the steering wheel about the pivotal axis extending along the transverse direction of the vehicle body so that the position of the steering wheel may be shifted to suit with the figure of the seated operator for him or her to easily rotate the steering wheel.

The tilting mechanism is configured to tilt the steering wheel to a desired position while maintaining the position of the control lever having switched to the tilting allowing mode for allowing tilting movement of the steering wheel, and then fix the steering wheel to the desired position by maintaining the position of the control lever having switched to the tilting preventing mode for preventing tilting movement of the steering wheel.

According to the conventional steering wheel apparatus disclosed in Japanese Unexamined Patent Application Publication No. 11-334605, for example, a distance from the top surface of a grip portion of the steering wheel to a swing axis of the control lever along the direction of the rotational axis is long. The control lever has a manual control portion that is swingably provided under the pivotal axis of the steering wheel, and the pivotal axis of the steering wheel is positioned closer to the driver's seat than the swing axis of the control lever is.

In tilting the steering wheel, the operator maintains the position of the control lever switched to the tilting allowing mode for allowing tilting movement of the steering wheel with one hand to tilt the steering wheel to a desired position with the other hand holding the grip portion of the steering wheel.

When the seated operator shifts the steering wheel to the desired position with such a steering wheel apparatus, the manual control portion of the control lever is difficult to operate because the manual control portion is swingably provided in a position lower than the pivotal axis of the steering wheel. Moreover, the operator needs to rotate the steering wheel with one hand and thus may feel difficulty in tilting the steering wheel to the desired position.

Further, since the pivotal axis of the steering wheel is positioned closer to the driver's seat than the swing axis of the control lever is, the space between the steering wheel and the driver's seat becomes small by a distance between those axes.

Still further, since the swing axis of the control lever is moved relative to the steering wheel when the steering wheel is tilted, the control lever and the steering wheel need to be arranged to prevent a pivotal operation of the control lever from interfering with a tilting operation of the steering wheel, which may result in a complicated construction.

SUMMARY OF THE INVENTION

In view of the above circumstances, it is desired to provide a steering wheel apparatus which allows the seated operator to easily shift the steering wheel to a desired position.

A tiltable steering wheel apparatus for a work vehicle according to the present invention comprises a rotationally operable steering wheel, and a tilting mechanism with a steering wheel support member for supporting the steering wheel to be tiltable about a pivotal axis extending along a transverse direction of a vehicle body, both of which are mounted forwardly of a driver's seat. The tilting mechanism includes a control lever switchable between a tilting allowing mode for allowing tilting movement of the steering wheel and a tilting preventing mode for preventing tilting movement of the steering wheel, and a lever support member for pivotably supporting the control lever about a swing axis extending along the transverse direction of the vehicle body. The steering wheel includes an annular grip portion to be rotatable about a rotational axis of the steering wheel. A distance from the top surface of the grip portion to the swing axis extending along the rotational axis does not exceed a distance corresponding to an outer-diameter dimension of the grip portion centered on the rotational axis. The manual control portion of the control lever is provided to be swingable in the vicinity of a region above the pivotal axis and under the grip portion.

With the above arrangement, the seated operator easily operate the manual control portion of the control lever since the distance from the top surface of the grip portion to the swing axis extending along the rotational axis does not exceed the distance corresponding to the outer-diameter dimension of the grip portion centered on the rotational axis. Further, it is possible for the operator to operate the manual control portion of the control lever with one hand holding the grip portion of the steering wheel, with both hands holding the grip portion. This arrangement allows the operator to easily operate the manual control portion of the control lever and to tilt the steering wheel with both hands, as a result of which the seated operator may easily shift the steering wheel to a desired position.

According to a preferred embodiment of the present invention, the manual control portion is provided to be swingable inwardly of an outer periphery of the steering wheel as viewed from a direction along the rotational axis. With this arrangement, the manual control portion is mounted in a compact way in a space under the steering wheel.

According to another preferred embodiment of the present invention, the swing axis is coaxial with the pivotal axis. This arrangement allows a space to be easily secured between the steering wheel and the driver's seat and prevents the swing axis of the control lever from being relatively moved with the steering wheel in tilting the steering wheel. This improves the operational efficiency. Further, it becomes quite easy to arrange the control lever and the steering wheel to prevent the swinging operation of the control lever from interfering with the tilting operation of the steering wheel.

According to a further preferred embodiment of the present invention, the steering wheel support member has a steering wheel support base for rotatably supporting the steering wheel, and a support shaft for pivotably supporting the steering wheel support base about the pivotal axis, the support shaft also acting as the lever support member. With this arrangement, since the support shaft for pivotably supporting the steering wheel support base also acts as the lever support member, the control lever is swingably supported about the pivotal axis of the steering wheel. This further simplifies the construction. In addition, the control lever is assembled to be swingably operable about the swing axis that is coaxial with the pivotal axis more easily than the arrangement in which the lever support member is formed by a separate support shaft other than the support shaft for the steering wheel support base.

According to a still further preferred embodiment of the present invention, the tilting mechanism includes an extendable and contractable fluid-pressure cylinder for allowing tilting movement of the steering wheel, and the control lever is switchable between the tilting allowing mode for allowing extension or contraction of the fluid-pressure hydraulic cylinder and the tilting preventing mode for preventing extension or contraction of the fluid-pressure hydraulic cylinder. The fluid-pressure cylinder is mounted in the interior of a dashboard provided forwardly of a driver's seat. With this arrangement, it is possible to switch the state between the tilting allowing mode for allowing extension or contraction of the fluid-pressure hydraulic cylinder to allow tilting movement of the steering wheel and the tilting preventing mode for preventing extension or contraction of the fluid-pressure hydraulic cylinder to inhibit tilting movement of the steering wheel. The position of the steering wheel defined by its tilting movement about the pivotal axis is selectable in a stepless way to fix the steering wheel to a desired position. In addition, the fluid-pressure cylinder is mounted in the interior of the dashboard provided forwardly of the driver's seat and thus less visible from the driver's seat, which improves the external appearance.

According to a still further preferred embodiment of the present invention, the fluid-pressure cylinder includes a switching mechanism for switching the fluid-pressure cylinder between a position for preventing extension or contraction and a position for allowing extension or contraction, the switching mechanism being urged to switch from the position for allowing extension or contraction to the position for preventing extension or contraction, and the control lever is configured to operate the switching mechanism against an urging force to be switchable to the position for allowing extension or contraction. With this arrangement, the switching mechanism is operated against the urging force to be switched to the position for allowing extension or contraction by a manual swingable operation of the control lever first. When the manual swingable operation of the control lever is released, the switching mechanism is switched to the position for preventing extension or contraction by the urging force, and thus the steering wheel can be easily adjusted to the desired position.

DESCRIPTION OF PREFERRED EMBODIMENTS

The embodiments of the present invention will be described hereinafter in reference to the accompanying drawings.

Figure 1:
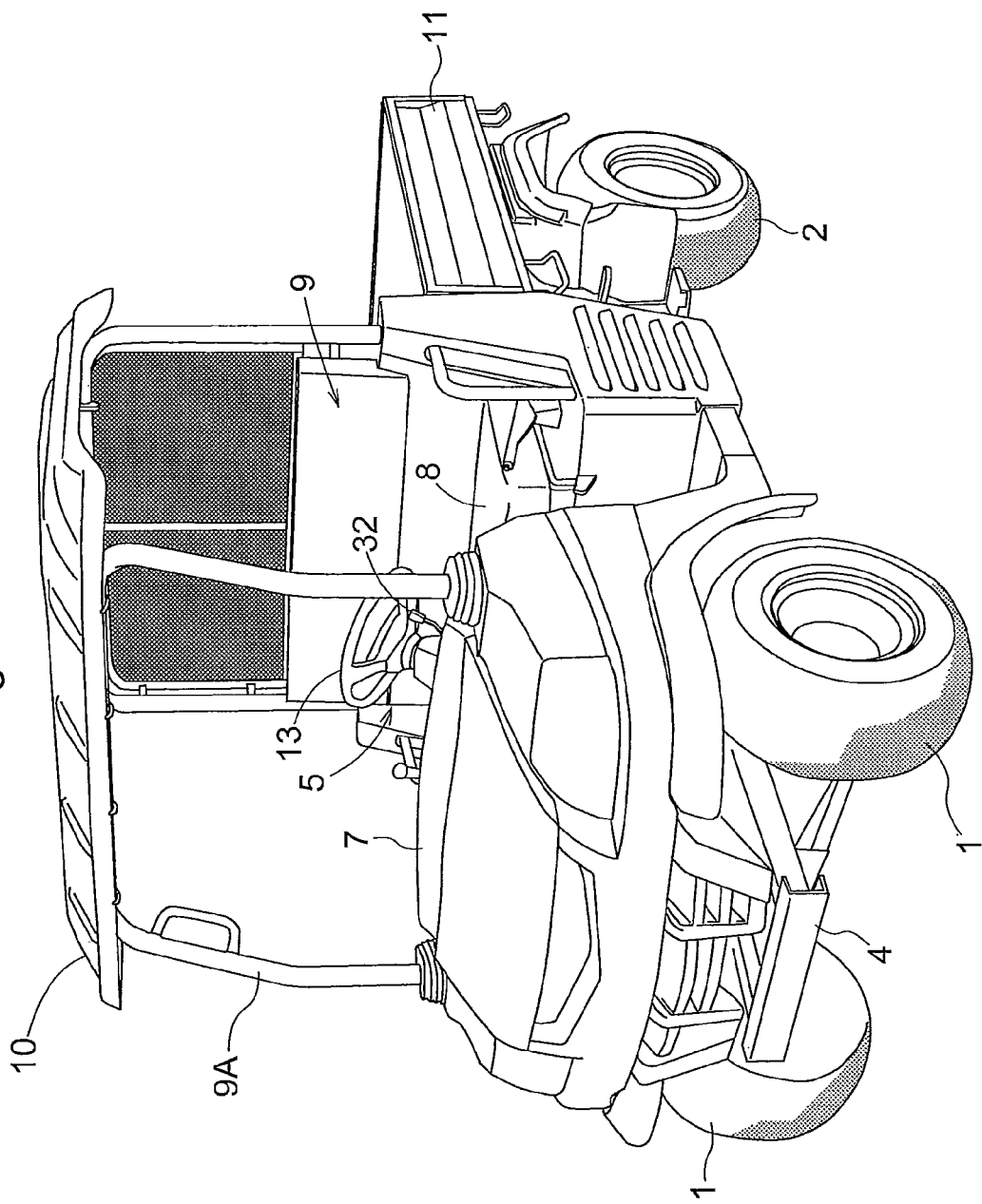
FIG. 1 is an overall perspective view of a work vehicle.
Figure 2:
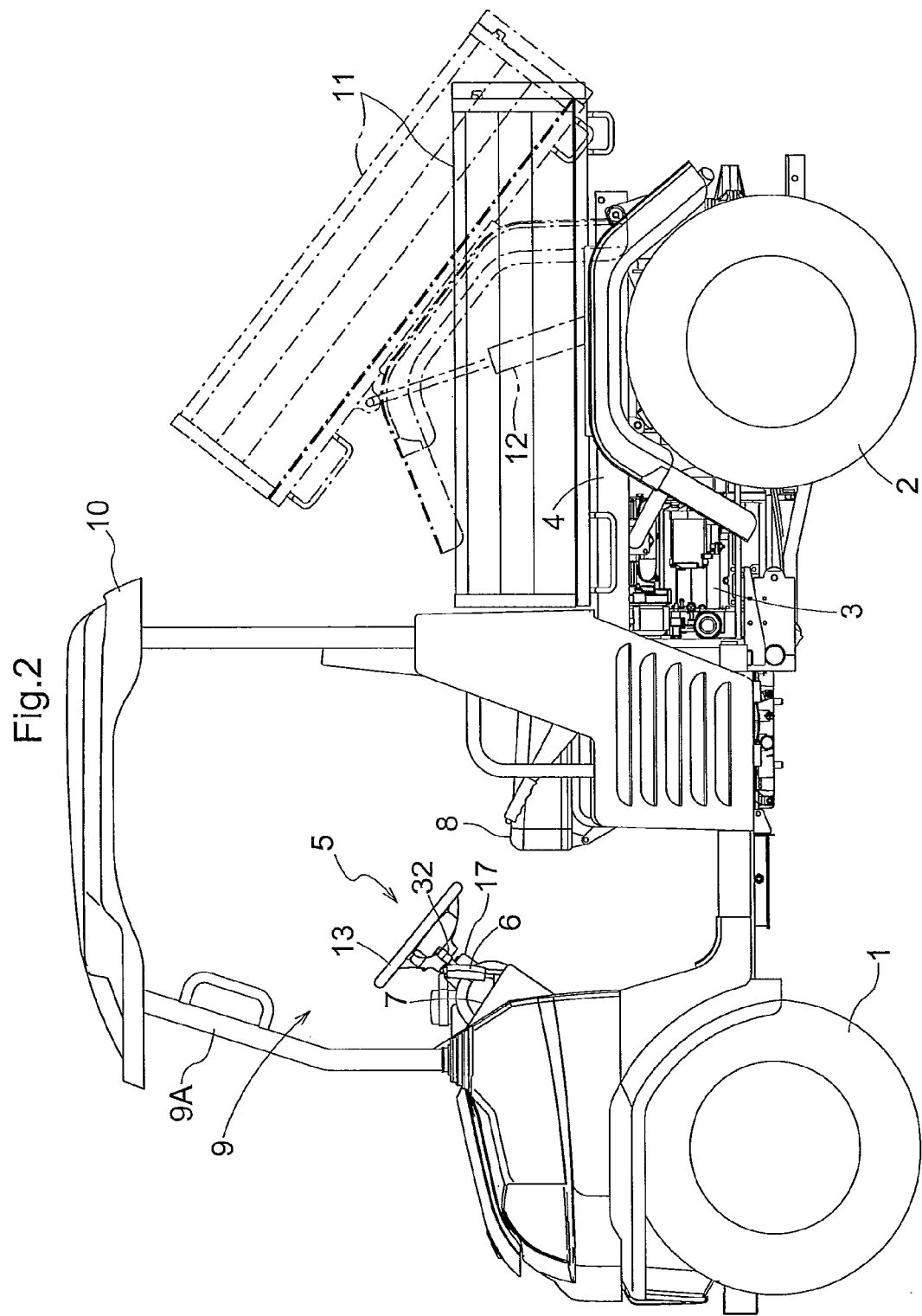
FIG. 2 is a overall side view of the work vehicle.
Figure 3:
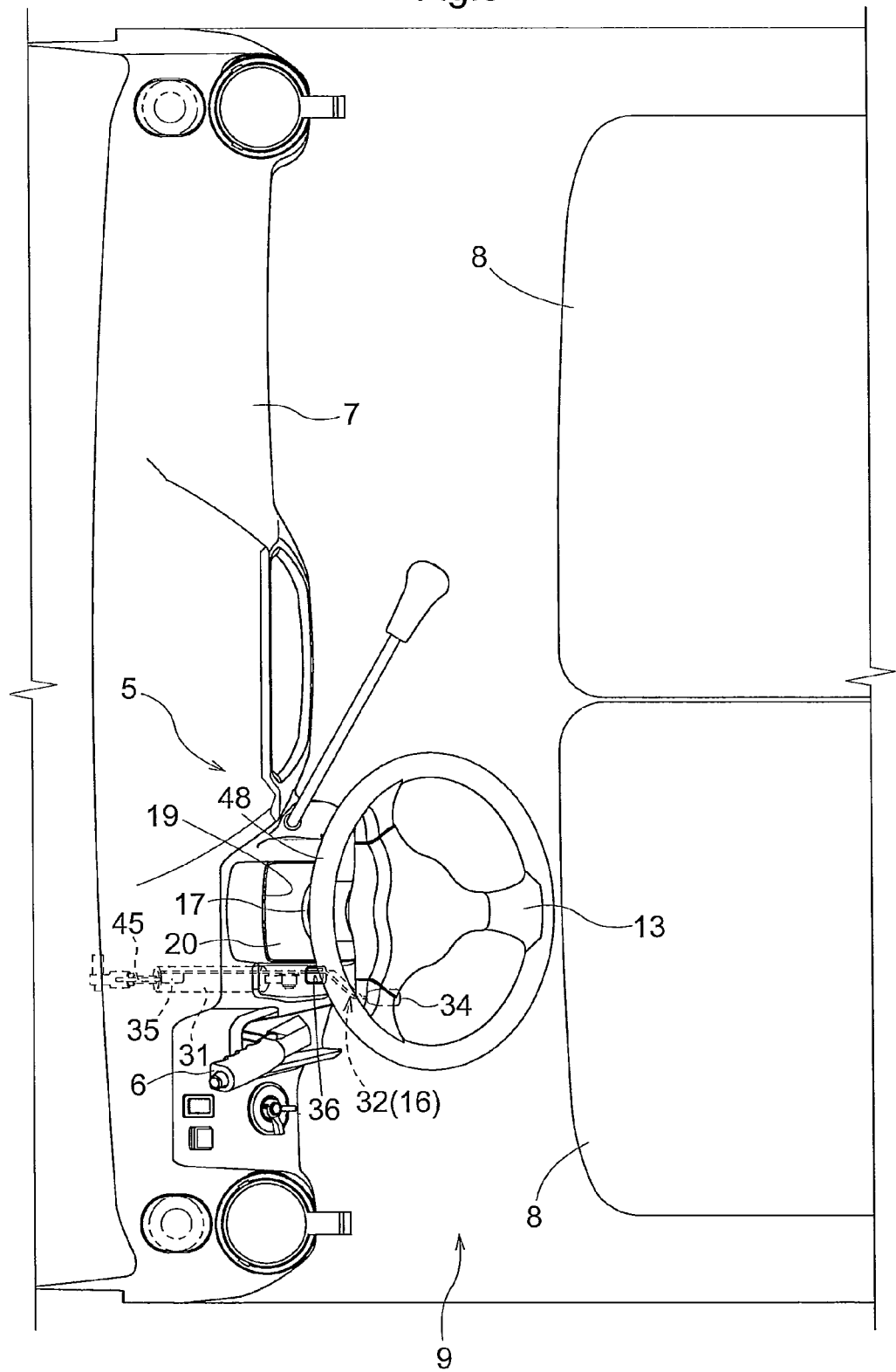
FIG. 3 is a plan view of a driver's section.

FIGS. 1 and 2 show a work vehicle such as a UV (utility vehicle) equipped with a steering wheel apparatus according to the present invention. The work vehicle comprises a pair of steerable right and left front wheels 1, a pair of right and left rear wheels 2, and an engine 3 mounted between the front wheels and rear wheels for driving the front and rear wheels 1 and 2.

The work vehicle further comprises a hood provided in a forward portion of a vehicle frame 4. In a longitudinal mid portion of the vehicle frame 4 are provided a driver's section 9 including a steering wheel apparatus 5 of the present invention, a forward/backward drive switching lever 6, a dashboard 7, all of which are provided forwardly of a driver's seat 8, a driver's section frame 9A mounted upright from the vehicle frame 4, and a sunshade 10 provided at the top of the driver's section frame 9A for covering the driver's section 9. In a rear portion of the vehicle frame 4 are provided a loading platform 11 and a damp cylinder 12 for vertically swinging the loading platform 11 about an axis extending transversely of a vehicle body at the rear part of the platform. The engine 3 and a transmission case are mounted under the loading platform 11.

As shown in FIGS. 3 to 9, the steering wheel apparatus 5 includes a rotatable steering wheel 13, a cylindrical hydraulic controller 14 for a full-hydraulic power steering apparatus for steering the pair of right and left front wheels 1, a tilting mechanism 16 having a steering wheel support member 15 for supporting the steering wheel 13 to be rotatable about a pivotal axis X extending transversely of the vehicle body, and an enclosure 17 for covering the hydraulic controller 14.

The steering wheel 13 is fixed to a rotatable control shaft 18 of the hydraulic controller 14 for rotating the rotatable control shaft 18. The enclosure 17 for covering the hydraulic controller 14 has a cylindrical portion projecting outward through an opening 19 formed in the dashboard 7, and a cover portion 20 having a fan shape as viewed from the side and integrally formed with the enclosure for closing the opening 19 from the inside of the dashboard 17.

Figure 8:
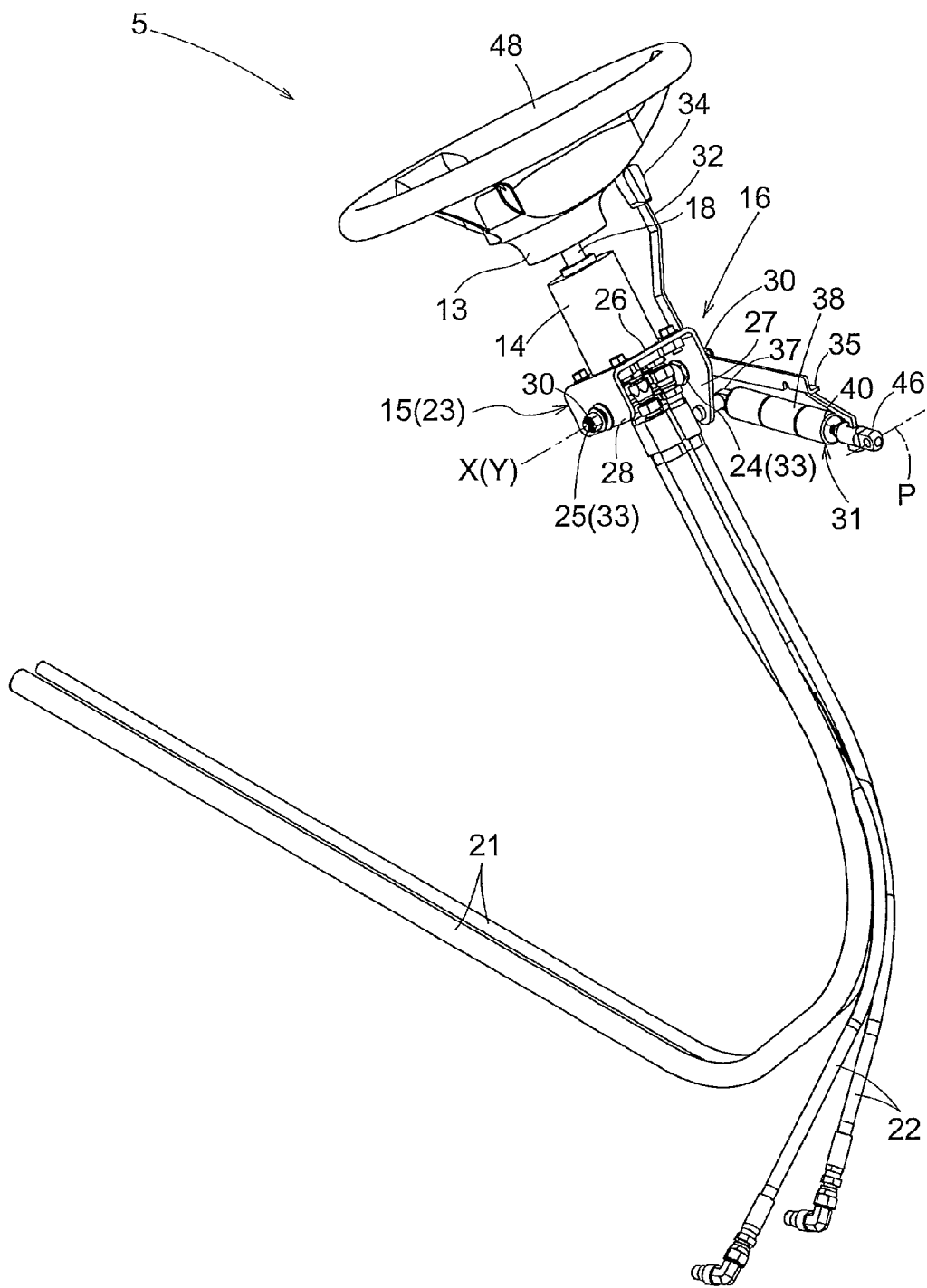
FIG. 8 is a perspective view of the tilting mechanism.

As shown in FIG. 8, to the hydraulic controller 14 are connected flexible pump-side pressure-oil hoses 21 that are connected to a hydraulic pump (not shown) and flexible cylinder-side pressure-oil hoses 22 that are connected to a hydraulic cylinder for steering the front wheels (not shown). A certain amount of pressure oil corresponding to a degree of rotating operation of the steering wheel 13 is fed in response to a direction of operating the steering wheel and is supplied to the hydraulic cylinder for steering the front wheels.

The steering wheel support member 15 has a steering wheel support base 23 to which a proximal portion of the hydraulic controller 14 is bolted for rotatably supporting the steering wheel 13 fixed to the rotatable control shaft 18, and support shafts 24 and 25 for pivotably supporting the steering wheel support base 23 about the pivotal axis X of the steering wheel 13.

The steering wheel support base 23 has an inverted U-shape formed from a fixing plate 26 to which the hydraulic controller 14 is bolted and support brackets 27 and 28 extending downwardly at opposite lateral sides of the fixing plate 26.

The support shafts 24 and 25 form headed bolts extending through the right and left support brackets 27 and 28 coaxially with each other. The headed bolts 24 and 25 extend through right and left frame members 29 fixed to the vehicle frame 4 to be secured by nuts 30. A support frame 4A extends upright from the vehicle frame 4, and a cross frame 4B is connected in the transverse direction to an upper part of the support frame 4A. The right and left frame members 29 are connected to the cross frame 4B at lower portions thereof.

The tilting mechanism 16 includes an extendable and contractable fluid-pressure cylinder 31 for allowing tilting movement of the steering wheel 13, a control lever 32 switchable between a tilting allowing mode for allowing tilting movement of the steering wheel 13 and a tilting preventing mode for preventing tilting movement of the steering wheel 13, and a lever support member 33 for pivotably supporting the control lever 32 about a swing axis Y extending coaxially with the pivotal axis X.

Further, the control lever 32 has an extension 32a extending from the swing axis Y toward a grip portion 48 of the steering wheel 13. The extension 32a has a manual control portion 34 formed at a distal end thereof that is operable with the fingers of the operator holding the grip portion 48.

The control lever 32 has a bent profile like a C-shape as viewed from the side with the swing axis Y between the manual control portion 34 and an operative portion 35 acting toward the fluid-pressure cylinder 31. The control lever 32 is switchable between the tilting allowing mode for allowing extension or contraction of the fluid-pressure cylinder 31 to allow tilting movement of the steering wheel 13 as shown in FIG. 5, and the tilting preventing mode for preventing extension or contraction of the fluid-pressure cylinder 31 to prevent tilting movement of the steering wheel 13 as shown in FIG. 4.

Figure 4:
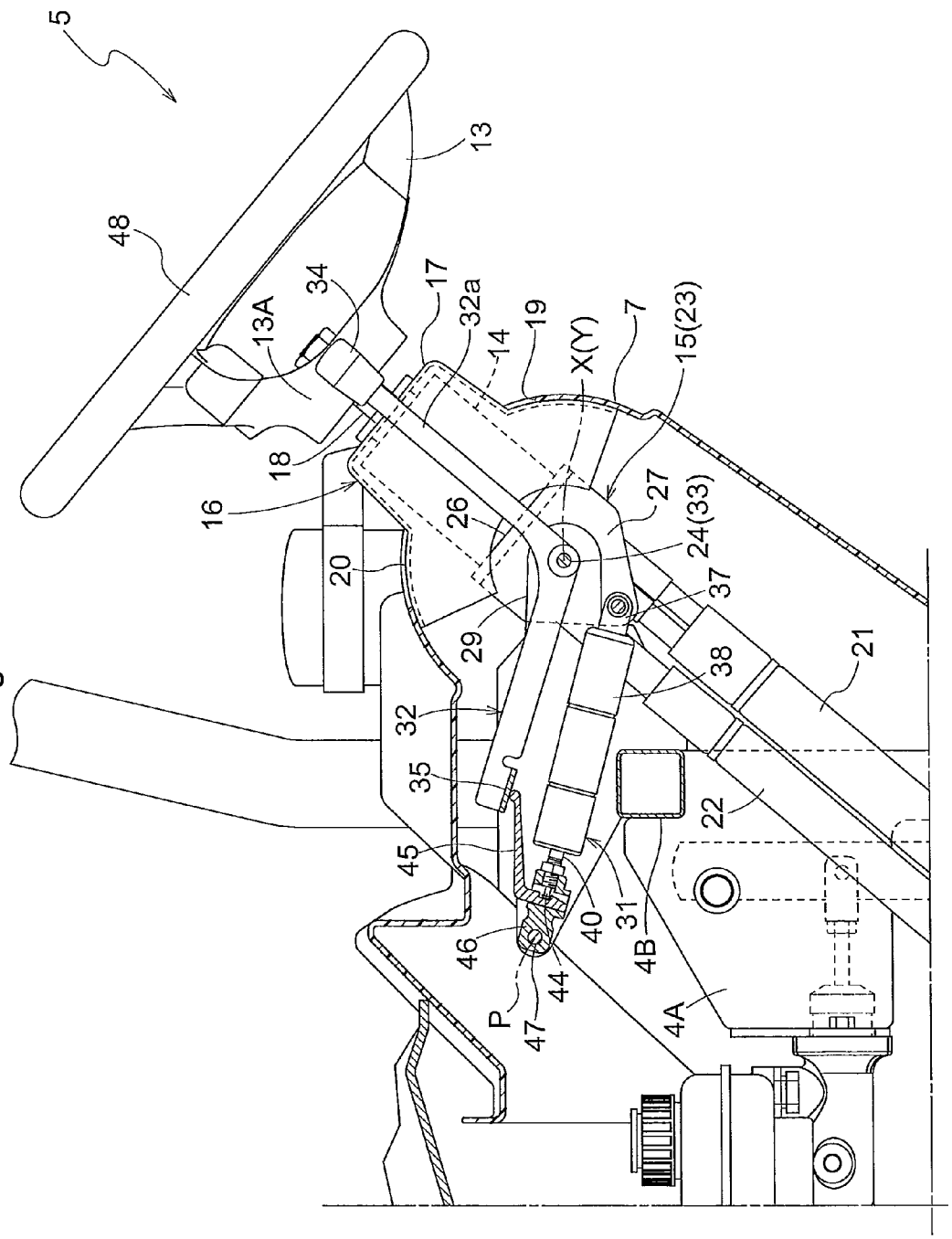
FIG. 4 is a side view of a tilting mechanism.
Figure 5:
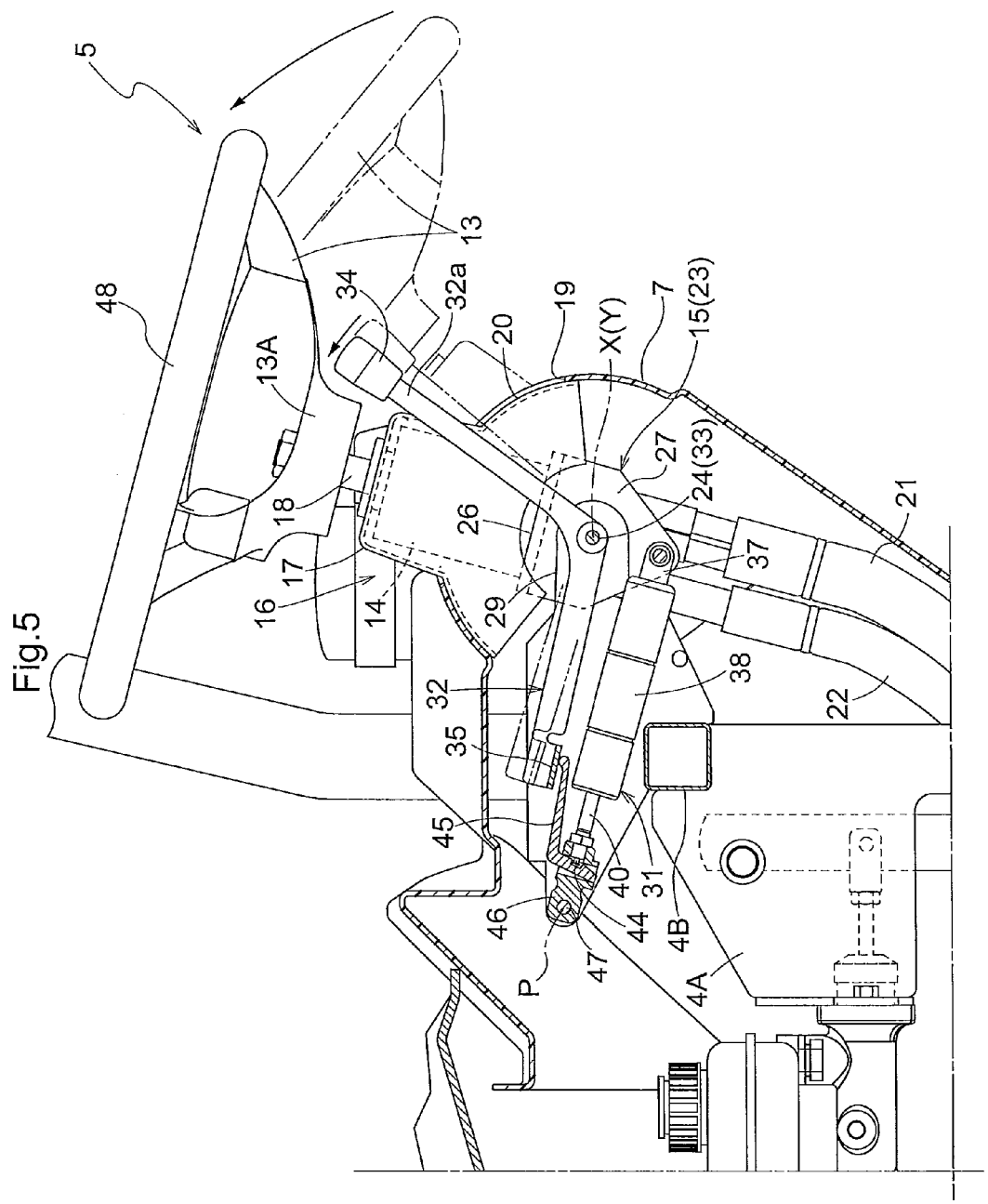
FIG. 5 is another side view of the tilting mechanism.
Figure 6:
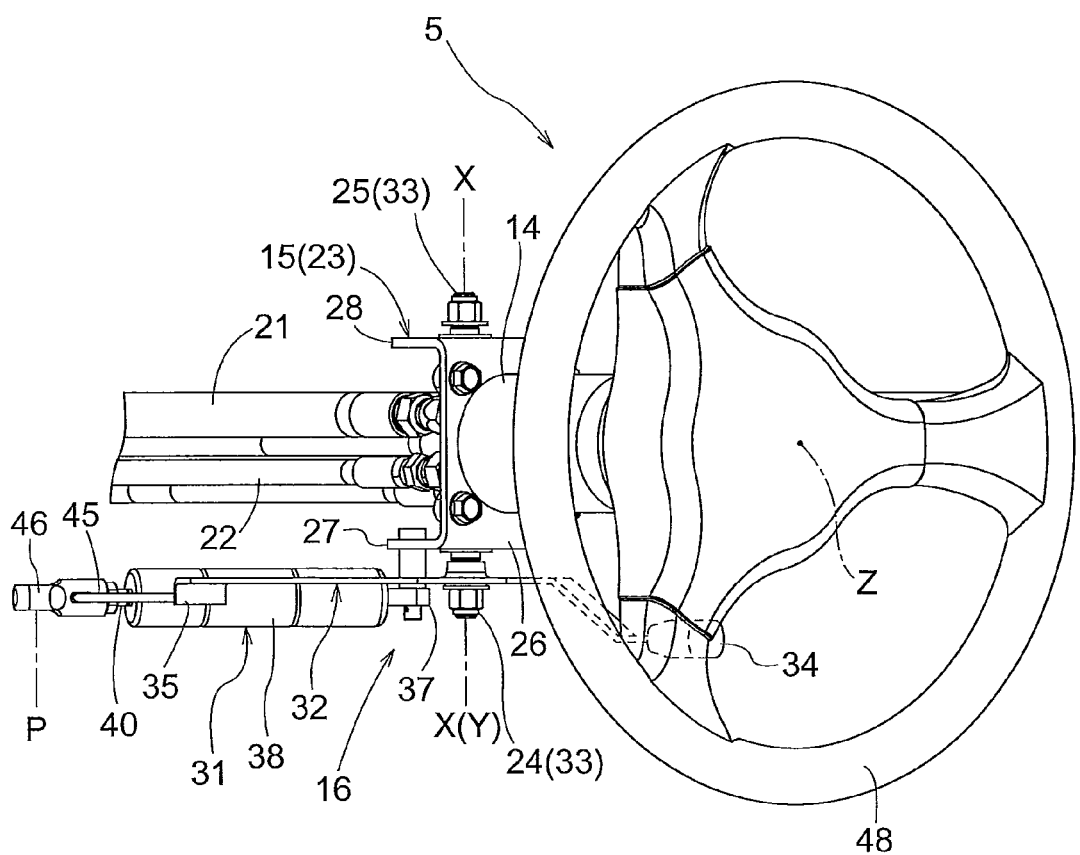
FIG. 6 is a plan view of the tilting mechanism.

In the state shown in FIG. 4, the rear part of the control lever 32 providing the manual control portion 34 and extending rearwardly from the swing axis Y extends obliquely upward and rearward along the axis of the rotatable control shaft 18, while the front part of the control lever 32 providing the operative portion 35 and extending forwardly from the swing axis Y extends obliquely upward and forward along the longitudinal direction of the fluid-pressure cylinder 31.

Figure 7:
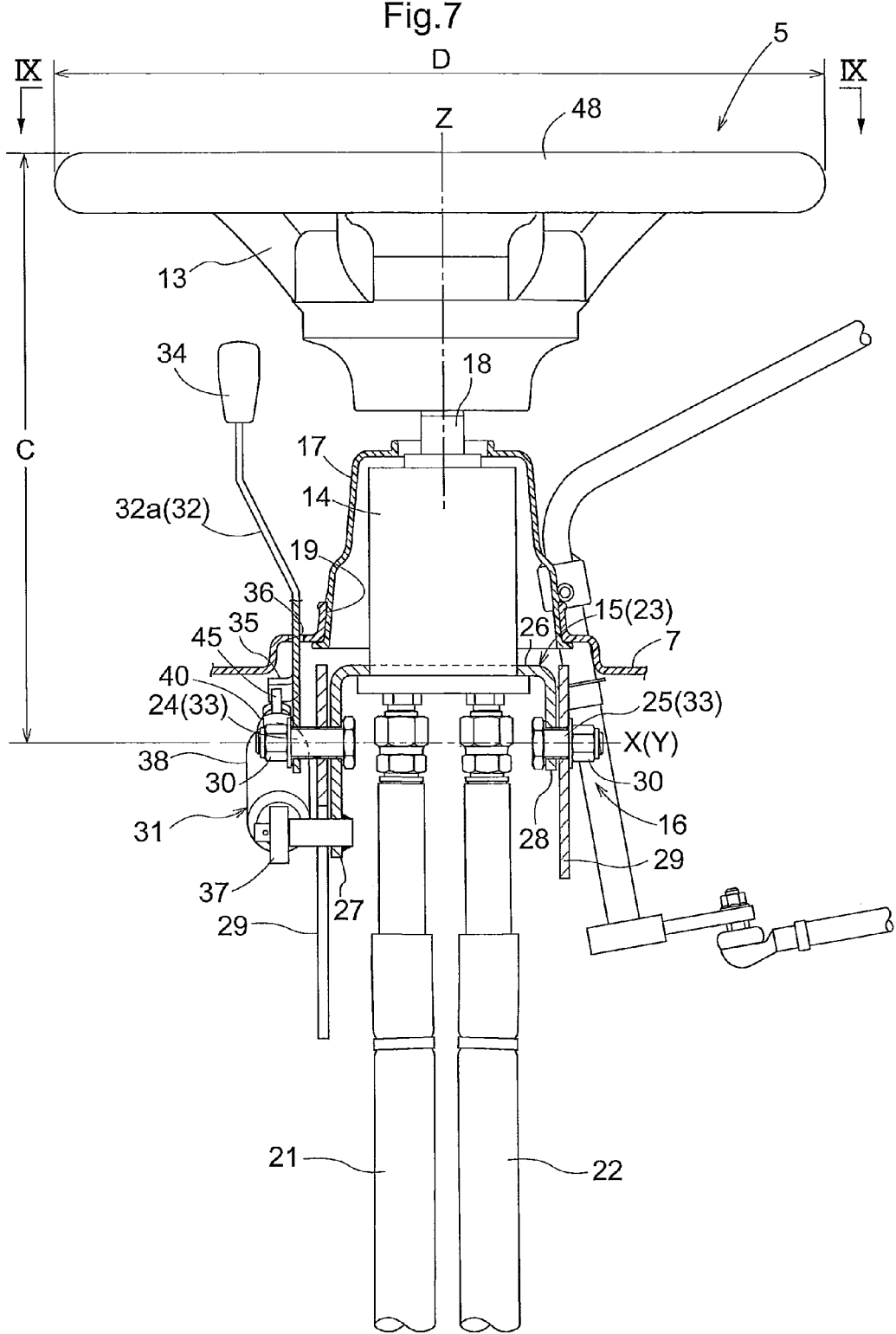
FIG. 7 is a rear view of the tilting mechanism as viewed from a driver's seat in a direction perpendicular to a rotational axis of a steering wheel.

As shown in FIG. 7, the manual control portion 34 of the control lever 32 projects toward the steering wheel 13 from a slot 36 formed in the dashboard 7. The slot 36 limits the swinging range of the control lever 32 so that the control lever 32 may be swingable between a tilting allowing position to establish the tilting allowing mode as shown in FIG. 5 and a tilting preventing position to establish the tilting preventing mode as shown in FIG. 4.

The control lever 32 is swingable supported by one of the headed bolts 24 for pivotably supporting the steering wheel support base 23 about the pivotal axis X and is urged by an unillustrated urging mechanism such as a spring so as to pivotably return to the tilting preventing position. Thus, the lever support member 33 also functions as one of the headed bolts 24 acting as the support shaft for pivotably supporting the steering wheel support base 23.

Figure 10:
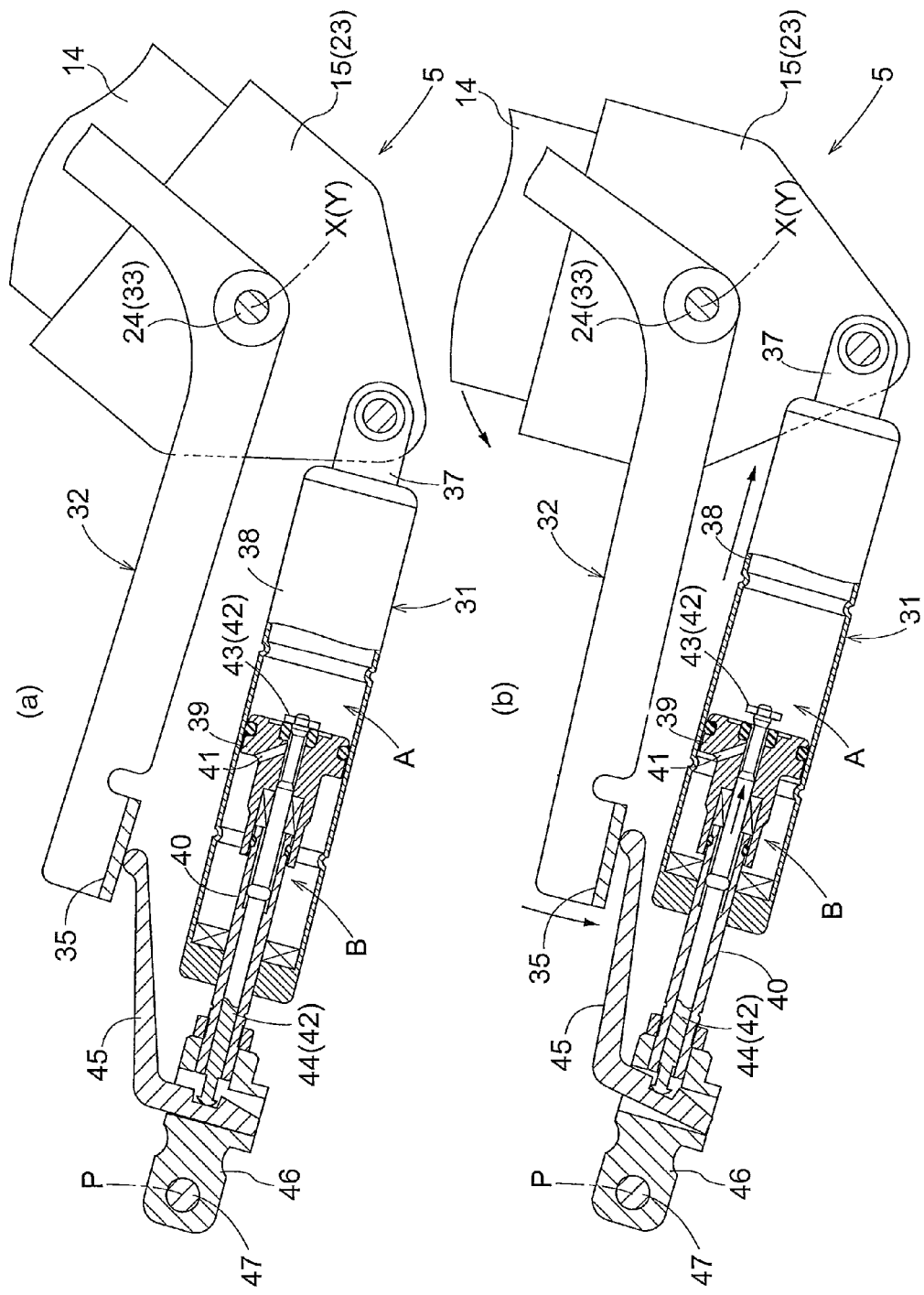
FIG. 10 is a sectional view showing the interior of a fluid-pressure cylinder (gas spring).

The fluid-pressure cylinder 31 is formed by a gas spring with a lock mechanism mounted inside of the dashboard 7. The gas spring (fluid-pressure cylinder) 31 is mounted in a compact way to assume an inclined posture slanting upward and forward between a lower portion of the support bracket 27 and a front end portion of the left frame member 29 to position in a space above the cross frame 4B mounted inside the dashboard 7. As shown in FIG. 10, the gas spring 31 includes a cylinder case 38 having a mounting ring 37 provided at one end thereof, a piston 39 for partitioning the interior of the cylinder case 38 into a first chamber A and a second chamber B, and a piston rod 40 connected to the piston 39. An orifice 41 is formed in the piston 39 to allow the first chamber A and the second chamber B to communicate with each other.

The gas spring 31 has a switching mechanism 42 for switching the gas spring 31 between a position for preventing extension or contraction and a position for allowing extension or contraction. The switching mechanism 42 is urged to switch from the position for allowing extension or contraction to the position for preventing extension or contraction.

The switching mechanism 42 includes a valve member 43 for switching between a communicating state as shown in FIG. 10(b) for allowing the first chamber A and the second chamber B to communicate with each other through the orifice 41 and a shutoff state as shown in FIG. 10(a) for blocking the communication between the first chamber A and the second chamber B with the orifice 41 being closed, a control rod 44 connected to the valve member 43, and a switching arm 45 for axially moving the control rod 44 to switch the valve member 43 between the communicating state and the shutoff state.

The valve member 43 is retractably attached to the piston rod 40 at the side of the first chamber A. The control rod 44 is coaxially mounted inside the piston rod 40 to retractably project from an end of the piston rod 40.

The switching arm 45 is attached to an arm mounting metal fitting 46 fixedly screwed to the end of the piston rod 40 to be pivotable about a pivotal point P. When the control rod 44 is pushed into the piston rod 40 to swing the switching arm 45, the valve member 43 moves to project toward the first chamber A thereby to switch to the position for allowing extension or contraction.

Pressure of oil or compressed gas filling the first chamber A acts on the valve member 43 that has moved to project from the piston 39 toward the first chamber A in a direction to retract the valve member 43 toward the piston 39, that is, in a direction to switch to the position for preventing extension or contraction. Thus, the switching mechanism 42 is urged to switch from the position for allowing extension or contraction to the position for preventing extension or contraction by an urging force of pressure of oil or compressed gas filling the first chamber A.

The mounting ring 37 provided in the one end of the cylinder case 38 is pivotably supported by the gas spring 31 at a portion of one of the support brackets 27 of the steering wheel support base 23 lower than the pivotal axis X. Further, a mounting ring 47 provided in the arm mounting metal fitting 46 is pivotably supported by the frame member 29 to be swingably supported to the support bracket 27 and the frame member 29 about a transverse axis of the vehicle body. Thus, the gas spring 31 is extended when the steering wheel 13 is tilted upward, while contracted when the steering wheel 13 is tilted downward.

With the gas spring 31 being switched to the position for preventing extension or contraction, the switching arm 45 presses the control lever 32 by an urging force to assist the control lever 32 to return to the tilting preventing position, in which the steering wheel 13 cannot be moved (tilted). The switching arm 45 is swung by manipulating the control lever 32 to operate the switching mechanism 42 against the urging force, that is, holding the grip portion 48 of the steering wheel 13 with one hand (right hand) while pushing the manual control portion 34 against the urging force with another hand (left hand) thereby to push the control rod 44 toward the piston rod 40. With this operation, the gas spring 31 is switched to the position for allowing extension or contraction to allow the operator to tilt the steering wheel 13 to a desired position with the one hand (right hand) holding the grip portion 48.

In the current embodiment, a distance from the manual control portion (point where force is applied) 34 to the swing axis Y is longer than a distance from the operative portion (point of application) 35 to the swing axis Y, and further, a distance from a free end (point where force is applied) of the switching arm 45 that is pushed down by the operative portion 35 of the control lever 32 to the pivotal point P is longer than a distance from a pressing portion (point of application) against the control rod 44 to the pivotal point P.

As a result, the control lever 32 can be operated with a light operating force to switch the gas spring 31 to the position for allowing extension or contraction.

Figure 9:
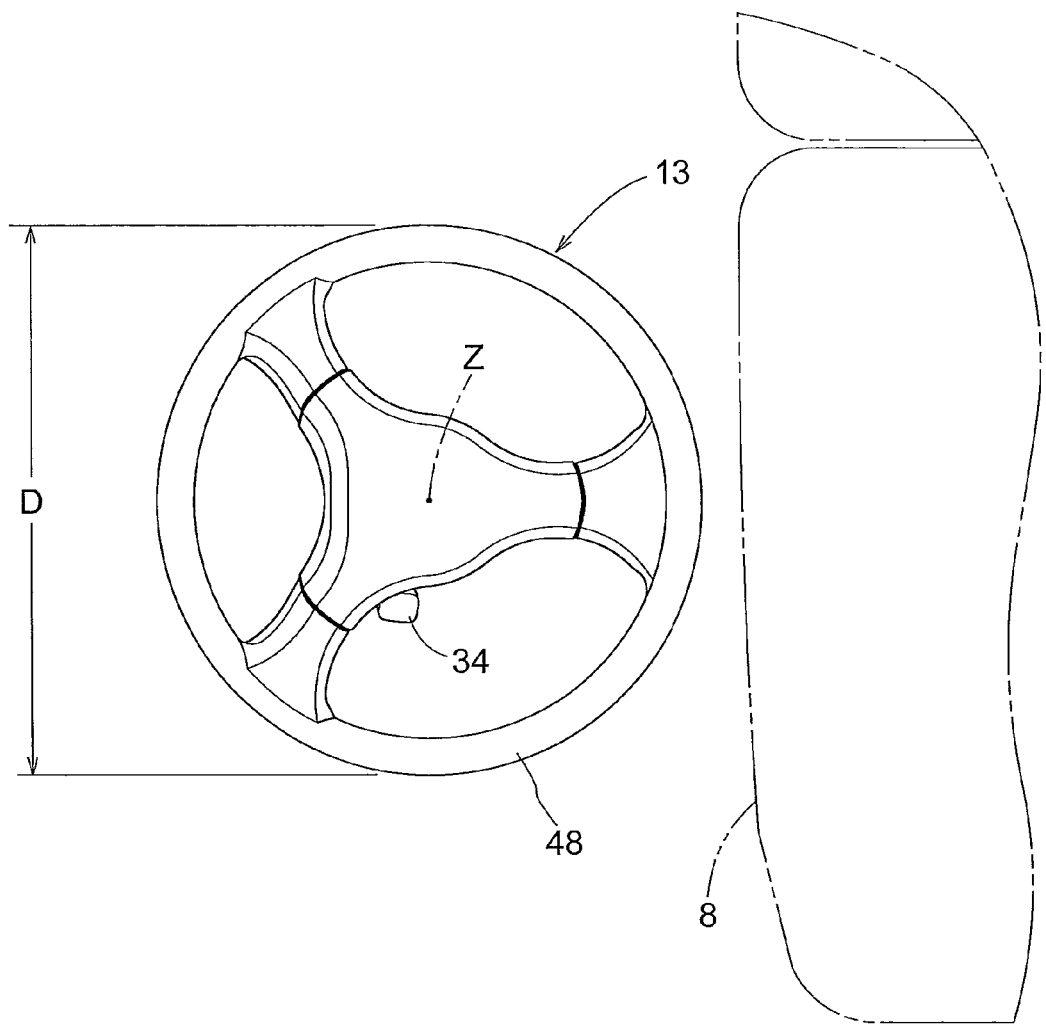
FIG. 9 is a sectional view taken on IX-IX line in FIG. 7.

As shown in FIG. 9, the steering wheel 13 includes the annular grip portion 48 that is rotatable about a rotational axis Z of the steering wheel 13. As shown in FIG. 7, a distance C from the top surface of the grip portion 48 to the swing axis Y extending along the rotational axis Z does not exceed a distance corresponding to an outer-diameter dimension D of the grip portion 48 centered on the rotational axis Z.

The manual control portion 34 of the control lever 32 is provided to be swingable in the vicinity of a region above the pivotal axis X and under the grip portion 48 (in the vicinity of a lateral outward region of a connecting boss portion 13A for connecting the steering wheel 13 to the rotatable control shaft 18), and to be swingable inwardly of an outer periphery of the steering wheel 13 as viewed from a direction along the rotational axis Z as shown in FIG. 9.

[Other Embodiments]

1. According to the steering wheel apparatus for the work vehicle of the present invention, the manual control portion 34 of the control lever 32 may be provided to be swingable outwardly of the outer periphery of the steering wheel 13 as viewed from a direction along the rotational axis Z.

2. The steering wheel apparatus for the work vehicle of the present invention may comprise a tilting mechanism for mechanically fixing the steering wheel that has been tilted in a desired position by an engaging member.

3. The steering wheel apparatus for the work vehicle of the present invention may have a symmetric arrangement of the above-noted primary embodiment, in which the gas spring 31, the control lever 32 or the like are mounted on the right side of the steering wheel 13. Further, this steering wheel apparatus may be provided not only for left-hand drive but also for a right-hand drive.

4. The steering wheel apparatus for the work vehicle of the present invention may employ a hydraulically operated damper instead of the gas spring acting as the fluid-pressure cylinder, and may employ a spring damper having a spring therein instead of the fluid-pressure cylinder.

5. The steering wheel apparatus for the work vehicle of the present invention is applicable to agricultural work vehicles and construction work vehicles.

What is claimed is:

1. A tiltable steering wheel apparatus for a work vehicle, comprising:
   a rotationally operable steering wheel including an annular grip portion to be rotatable about a rotational axis of the steering wheel; and
   a tilting mechanism provided under the grip portion including:
      a steering wheel support member for supporting the steering wheel to be tiltable about a pivotal axis extending along a transverse direction of a vehicle body;
      a control lever switchable between a tilting allowing mode for allowing tilting movement of the steering wheel and a tilting preventing mode for preventing tilting movement of the steering wheel, the control lever being pivotable about a swing axis extending along the transverse direction of the vehicle body, the control lever having a first extension extending radially from the swing axis toward the grip portion and a second extension extending radially from the swing axis at an incremental distance from the first extension the first extension having a manual control portion at a distal end thereof for allowing a driver holding the grip portion of the steering wheel to operate the control lever with fingers of the driver; the second extension having an operative portion for the tilting mechanism; and
      a lever support member for pivotably supporting the control lever,
   wherein the manual control portion is provided within a space defined by an inner periphery of the steering wheel in the direction of the rotational axis; and
   wherein the control lever pivots within a swing range thereof defined between a first swing angle position about the swing axis providing the steering wheel with the tilting allowing mode and a second swing angle position about the swing axis providing the steering wheel with the tilting preventing mode, and a swing locus described b the manual control portion extends closer to the grip portion of the steering wheel than to the swing axis.

2. The tiltable steering wheel apparatus for the work vehicle as claimed in claim 1, wherein the swing axis is coaxial with the pivotal axis.

3. A tiltable steering wheel apparatus for a work vehicle, comprising:
   a rotationally operable steering wheel comprising a grip portion that rotates about a rotational axis of the steering wheel; and
   a tilting mechanism with a steering wheel support member for supporting the steering wheel to be tiltable about a pivotal axis extending along a transverse direction of a vehicle body, the tilting mechanism including
      a control lever switchable between a tilting allowing mode for allowing tilting movement of the steering wheel and a tilting preventing mode for preventing tilting movement of the steering wheel, the control lever being pivotable about a swing axis extending along the transverse direction of the vehicle body, the control lever having a first extension extending radially from the swing axis toward the grip portion and a second extension extending radially from the swing axis at an incremental distance from the first extension, the first extension having a manual control portion of the steering wheel to operate the control lever with the fingers of the driver, the second extension having an operative portion for the tilting mechanism; and
      a lever support member for pivotably supporting the control lever,
   wherein a distance from the top surface of the grip portion to the swing axis extending along the rotational axis does not exceed a distance corresponding to an outer-diameter dimension of the grip portion centered on the rotational axis,
   wherein the control lever pivots within a swing range thereof defined between a first position providing the steering wheel with the tilting allowing mode and a second position providing the steering wheel with the tilting preventing mode, and wherein the control lever has a manual control portion disposed in the vicinity of a region above the pivot axis under the grip portion for allowing a driver holding the grip portion of the steering wheel to operate the control lever with fingers of the driver.

4. The tiltable steering wheel apparatus for the work vehicle as claimed in claim 3, wherein the manual control portion is provided to be swingable inwardly of an outer periphery of the steering wheel as viewed from a direction along the rotational axis.

5. The tiltable steering wheel apparatus for the work vehicle as claimed in claim 3, wherein the swing axis is coaxial with the pivotal axis.

6. The tiltable steering wheel apparatus for the work vehicle as claimed in claim 5, wherein the steering wheel support member has a steering wheel support base for rotatably supporting the steering wheel, and a support shaft for pivotably supporting the steering wheel support base about the pivotal axis, and wherein the support shaft also acts as the lever support member.

7. The tiltable steering wheel apparatus for the work vehicle as claimed in claim 3, wherein the tilting mechanism includes an extendable and contractable fluid-pressure cylinder for allowing tilting movement of the steering wheel, wherein the control lever is switchable between the tilting allowing mode for allowing extension or contraction of the fluid-pressure cylinder and the tilting preventing mode for preventing extension or contraction of the fluid-pressure cylinder, and wherein the fluid-pressure cylinder is mounted in the interior of a dashboard provided forwardly of a driver's seat.

8. The tiltable steering wheel apparatus for the work vehicle as claimed in claim 7, wherein the fluid-pressure cylinder includes a switching mechanism for switching the fluid-pressure cylinder between a position for preventing extension or contraction and a position for allowing extension or contraction, the switching mechanism being urged to switch from the position for allowing extension or contraction to the position for preventing extension or contraction, and wherein the control lever is configured to operate the switching mechanism against an urging force to be switchable to the position for allowing extension or contraction.

9. A tiltable steering wheel apparatus for a work vehicle, comprising: a rotationally operable steering wheel; and a tilting mechanism with a steering wheel support member for supporting the steering wheel to be tiltable about a pivotal axis extending along a transverse direction of a vehicle body, the tilting mechanism including a control lever switchable between a tilting allowing mode for allowing tilting movement of the steering wheel and a tilting preventing mode for preventing tilting movement of the steering wheel; a lever support member for pivotably supporting the control lever about a swing axis extending along the transverse direction of the vehicle body; and a fluid-pressure cylinder operatively connected with an operative portion of the control lever and configured to extend and contract for allowing rotation of the steering wheel, the fluid-pressure cylinder having a cylinder rod movable straight along an axis extending transversely relative to the pivotal axis, wherein the steering wheel includes an annular grip portion that rotates about a rotational axis of the steering wheel, in which a distance from the top surface of the grip portion to the swing axis extending along the rotational axis does not exceed a distance corresponding to an outer-diameter dimension of the grip portion centered on the rotational axis, wherein the manual control portion of the control lever is provided to be swingable in the vicinity of a region above the pivotal axis and under the grip portion, and wherein the control lever includes a first arm defining the manual control portion and a second arm defining the operative portion to form a C-letter shaped lever, the first arm extending along the rotational axis of the steering wheel and the second arm extending the axis of the cylinder rod.

10. The tiltable steering wheel apparatus for the work vehicle as claimed in claim 9, further comprising:

a dashboard covering the tilting mechanism, the dashboard having a rear side facing a driver's seat and an upper side facing the steering wheel, the rear side extending along the first arm and the upper side extending along the second arm.

11. The tiltable steering wheel apparatus for the work vehicle as claimed in claim 9, wherein the fluid-pressure cylinder is disposed in a horizontal posture within a space defined between a lateral frame forming a vehicle frame and an upper side of a dashboard.

12. The tiltable steering wheel apparatus for the work vehicle as claimed in claim 9, wherein allowing a free movement of the cylinder rod provides the control lever with the tilting allowing mode, and preventing the movement of the cylinder rod provides the control lever with the tilting preventing mode.

* * * * *

UNITED STATES PATENT AND TRADEMARK OFFICE
CERTIFICATE OF CORRECTION

PATENT NO. : 8,720,299 B2
APPLICATION NO. : 13/051565
DATED : May 13, 2014
INVENTOR(S) : Norimi Nakamura et al.

Page 1 of 1

It is certified that error appears in the above-identified patent and that said Letters Patent is hereby corrected as shown below:

In the Claims

Column 8, Lines 11-12, Claim 1, after "extension" insert -- , --

Column 8, Line 28, Claim 1, delete "b" and insert -- by --

Signed and Sealed this
Thirtieth Day of September, 2014

Michelle K. Lee
*Deputy Director of the United States Patent and Trademark Office*